(12) United States Patent
Liu et al.

(10) Patent No.: US 8,574,748 B2
(45) Date of Patent: Nov. 5, 2013

(54) HOLDING MECHANISM AND ELECTRONIC DEVICE USING THE SAME

(75) Inventors: Wei Liu, Shenzhen (CN); Na Wang, Shenzhen (CN); Bao-Gang Zhao, Shenzhen (CN); Ting-Ting Zhao, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 299 days.

(21) Appl. No.: 13/173,158

(22) Filed: Jun. 30, 2011

(65) Prior Publication Data

US 2012/0171540 A1 Jul. 5, 2012

(30) Foreign Application Priority Data

Dec. 29, 2010 (CN) .......................... 2010 1 0611401

(51) Int. Cl.
*H01M 2/00* (2006.01)

(52) U.S. Cl.
USPC ............... 429/163; 429/96; 429/97; 429/100; 429/138; 429/151; 429/153; 429/154; 429/159; 429/175

(58) Field of Classification Search
USPC ....................... 429/96–97, 99–100, 138, 151, 429/153–154, 159, 163, 175–176
See application file for complete search history.

(56) References Cited

U.S. PATENT DOCUMENTS

2007/0111087 A1* 5/2007 Tsai .............................. 429/100

\* cited by examiner

*Primary Examiner* — Patrick Ryan
*Assistant Examiner* — Ben Lewis
(74) *Attorney, Agent, or Firm* — Altis & Wispro Law Group, Inc.

(57) ABSTRACT

A holding mechanism for holding a battery includes a retaining member, a resisting member ant at least two limiting members. The retaining member limits the battery from movement in a first direction. The resisting member corresponds to the retaining member and engages with the retaining member to cooperatively support and limit the battery from movement in a second direction perpendicular to the first direction. The at least two limiting members are arranged at opposite sides of the retaining member and are used for limiting the battery from movement in a third direction. The third direction is perpendicular to the first direction and the second direction. An electronic device using the holding mechanism is also provided.

13 Claims, 5 Drawing Sheets

HOLDING MECHANISM AND ELECTRONIC DEVICE USING THE SAME

BACKGROUND

1. Technical Field

The present disclosure relates to electronic devices; and particularly to an electronic device having a holding mechanism.

2. Description of Related Art

Electronic devices, such as DVD players, include a housing, a battery and a fixing apparatus for securing the battery to the housing. The fixing apparatus is typically mounted to the housing with screws. However, the fixing apparatus always occupies a large space of the housing, and a plurality of screws must be used to fix the bracket to the housing.

Therefore, there is room for improvement in the art.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the five views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
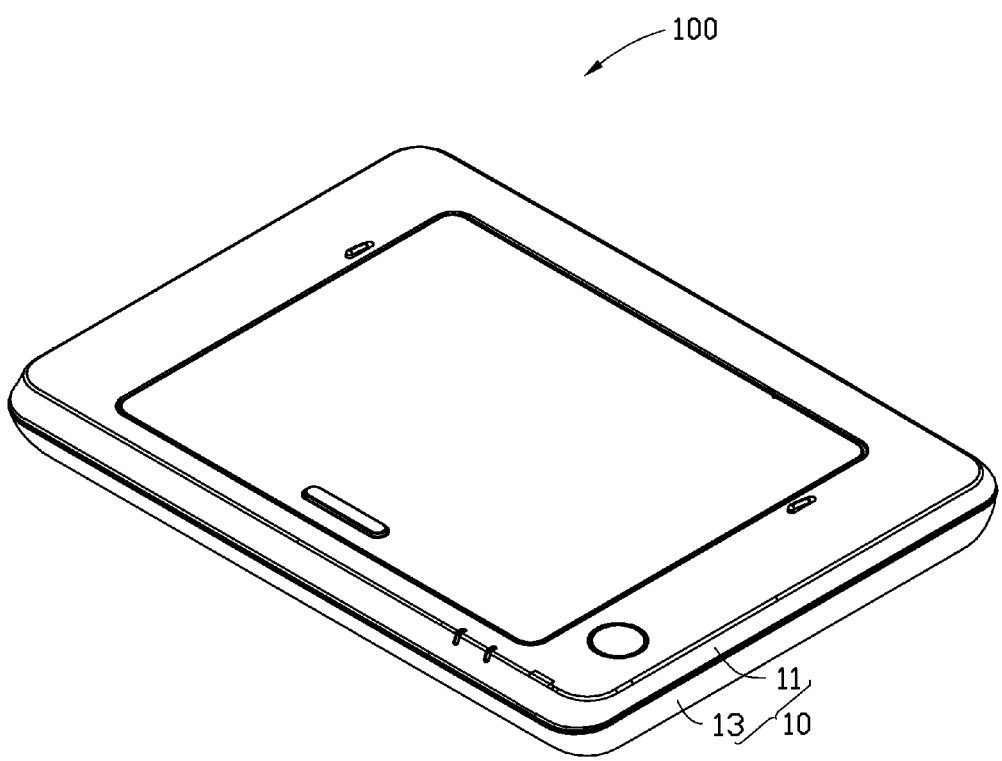
FIG. 1 is a perspective view of an electronic device in accordance with an embodiment.
Figure 2:
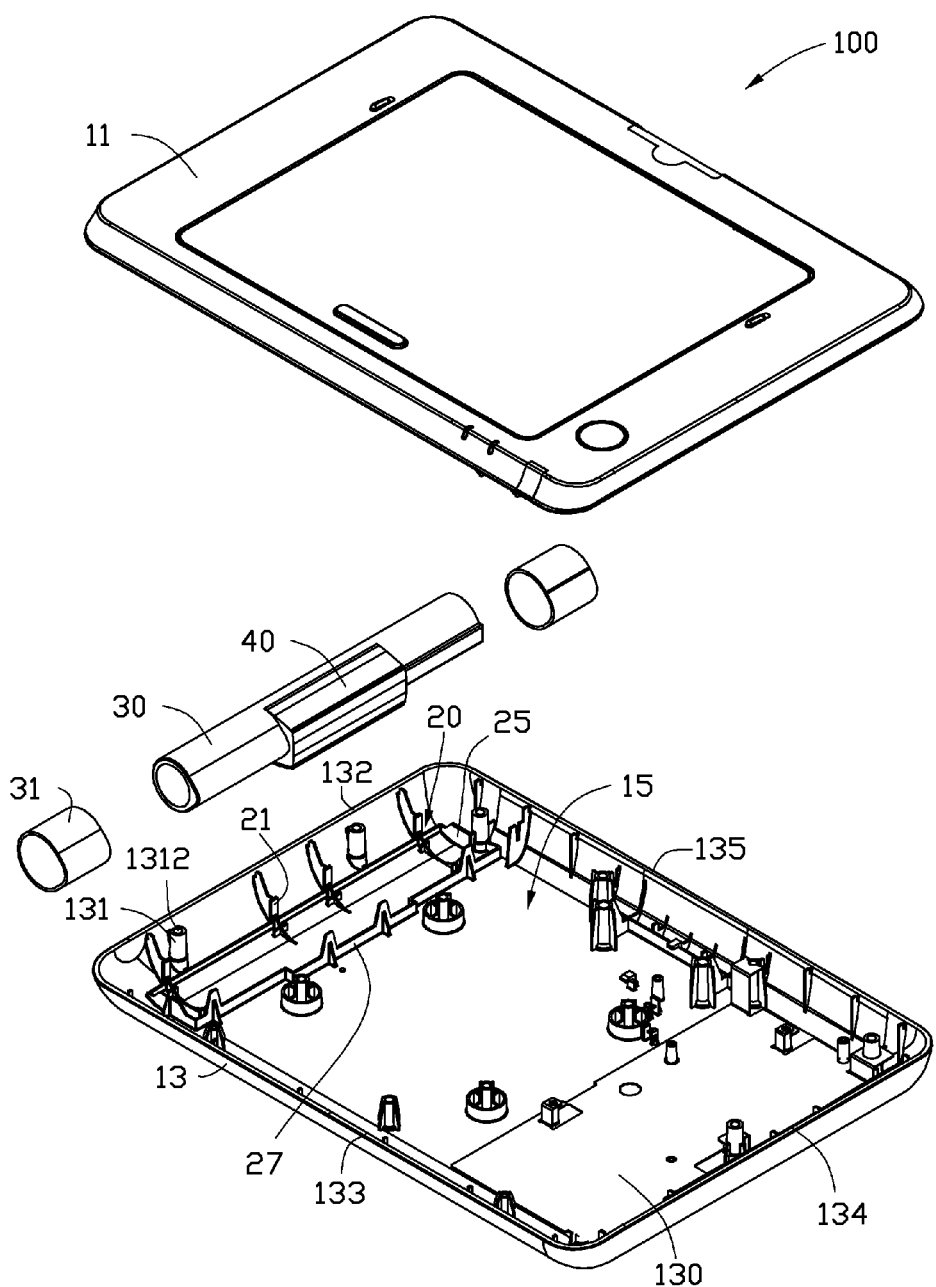
FIG. 2 is a partially disassembled perspective view of the electronic device of FIG. 1.

Referring to FIGS. 1 and 2, an electronic device 100 in accordance with an embodiment is shown. The electronic device 100 may be a DVD player in the embodiment. The electronic device 100 includes a housing 10, a holding mechanism 20 accommodated in the housing 10, a battery 30 for supplying power to the electronic device 100, and a power management module 40 electrically connected to the battery 30.

The housing 10 includes a top case 11 and a bottom case 13 engaging with the top case 11. The top case 11 and the bottom case 13 cooperatively define a receiving space 15 for accommodating the holding mechanism 20, the battery 30, and other components (not shown, such as motherboard, processor, disc driver) for operating the electronic device 100 therein.

Figure 3:
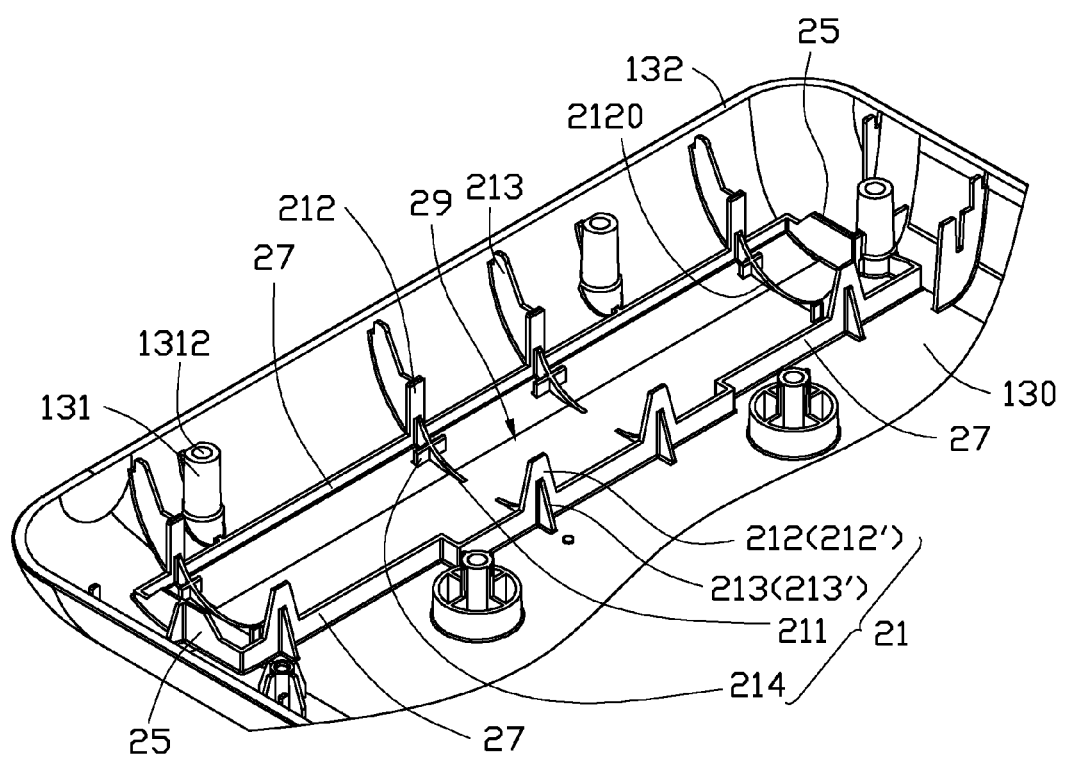
FIG. 3 is a partial perspective view of the electronic device of FIG. 2.
Figure 4:
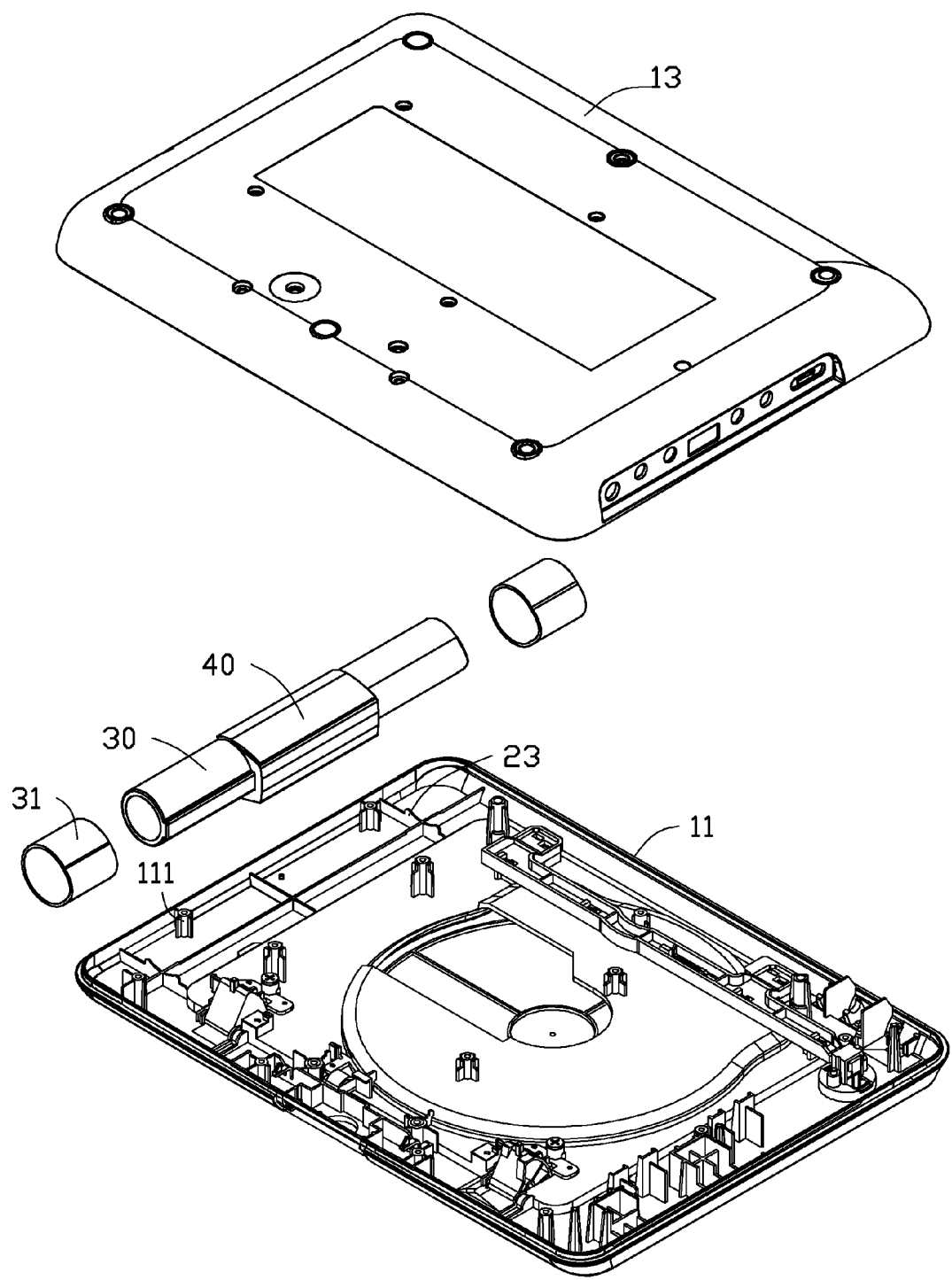
FIG. 4 is similar to FIG. 2, but viewed from another aspect.

Referring also to FIGS. 3-4, the top case 11 is substantially rectangular. A plurality of first fixing posts 111 project from an inner surface of the top case 11. The bottom case 13 includes a substantially rectangular base 130 and four sidewalls (hereinafter, a first sidewall 132, a second sidewall 133, a third sidewall 134, and a fourth sidewall 135) projecting from rims of the base 130. The first sidewall 132, the second sidewall 133, the third sidewall 134 opposite the first sidewall 132, and the fourth sidewall 135 opposite the second sidewall 133 are interconnected with each other. A plurality of second fixing posts 131 project from the case 13 and correspond to the first fixing post 111. Each second fixing post 131 axially defines a through hole 1312. The through holes 1312 extend through the base 130. Screws (not shown) pass through the through holes 1312 from an outer surface of the base 130 and screw into the corresponding first fixing posts 111, thereby the top case 11 is secured to the bottom case 13.

The battery 30 is substantially elliptic in cross section in the present embodiment. Two cushioning members 31 are respectively arranged at opposite ends of the battery 30 to protect the battery 30 from vibration and impact force. The cushioning members 31 may be made of rubber, foam, or other flexible material. In other embodiments, the cushioning members 31 may cover the complete outer surface of the battery 30.

Referring again to FIGS. 2 and 3, the holding mechanism 20 includes four retaining members 21, a resisting member 23 (shown in FIG. 4), and two limiting members 25. The four retaining members 21 are used to limit the movement of the battery 30 in a first direction. The resisting member 23 engages with the retaining members 21 to cooperatively sandwich and limit the battery 30 in a second direction perpendicular to the first direction. The two limiting members 25 are arranged at opposite sides of the retaining members 21 and are used to limit the battery 30 in a third direction perpendicular to the first and second direction. The first, second and third direction cooperatively define an X, Y, Z coordinate system. In the embodiment, the first direction is perpendicular to the first sidewall 132, the second direction is perpendicular to the base 130, and the third direction is parallel to the first sidewall 132.

The limiting members 25 project from the base 130, and are arranged adjacent to the second and fourth sidewalls 133, 135 respectively. The limiting members 25 are perpendicular to the first sidewall 132. The distance between the limiting members 25 is slightly larger than the length of the battery 30, such that the battery 30 is limited between the limiting members 25.

The retaining members 21 are arranged on the base 130, and are located between the limiting members 25. The retaining members 21 are substantially aligned in a straight line (not shown) extending in a direction parallel to the first sidewall 132. Each retaining member 21 includes a supporting portion 211 and two limiting portions 212 arranged at opposite ends of the supporting portion 211. The supporting portion 211 projects from the base 130 and is substantially perpendicular to the first sidewall 132. The supporting portion 211 is recessed to define an arcuate recess 2120 for holding the battery 30. The limiting portion 212 projects from the base 130, and is perpendicular to the corresponding supporting portion 211. The two limiting portions 212 cooperatively sandwich the battery 30 to limit the movement of the battery 30 in the first direction. In the embodiment, the structure of the retaining members 21 are substantially similar, the difference is that the supporting portions 211 of two retaining members 21 located in the middle are cut into two parts.

Referring to FIG. 3, each retaining member 21 further includes two first reinforcing members 213 and two second reinforcing members 214. The first reinforcing members 213 are attached to the limiting portions 212 respectively to reinforce or strengthen the corresponding limiting portion 212. One of the first reinforcing members 213 projects from the first sidewall 132 and is attached to the corresponding limiting portion 212 adjacent to the first sidewall 132, and the other first reinforcing member 213 (labeled as 213') projects from the base 130 and is attached to the other limiting portion 212 (labeled as 212') away from the first sidewall 134. The second reinforcing members 214 project from the supporting portion 211 and are adjacent to the limiting portions 212 respectively. Each second reinforcing member 214 orthogonally intersects with the supporting portion 211, whereby the supporting portion 211 is reinforced.

Furthermore, a plurality of protruding members 27 projects from the base 130. The protruding members 27 interconnect the limiting portions 212 and the limiting members 25 to define a receiving portion 29 for receiving the battery 30. The shape of the receiving portion 29 matches with the shape of the battery 30.

Figure 5:
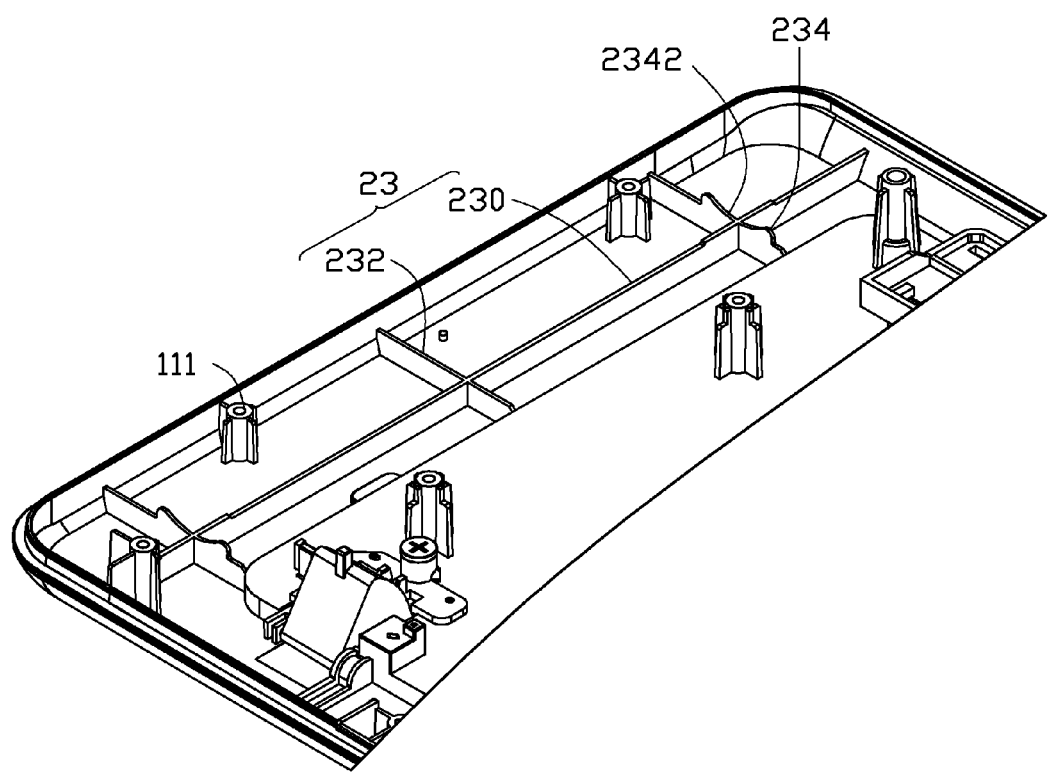
FIG. 5 is a partial perspective view of the electronic device of FIG. 4.

Referring to FIG. 5, the resisting member 23 is mounted to the top case 11. The resisting member 23 corresponds to the retaining members 21, and engages with the retaining members 21 to cooperatively sandwich and limit the battery 30 from movement in the second direction. The resisting member 23 includes a first resisting portion 230 and three second resisting portions 232 orthogonally intersecting with the first resisting portion 230. The first resisting portion 230 extends in the second direction. The second resisting portions 232 extend in the first direction. Two protrusions 234 respectively project from two of the second resisting portions 232 adjacent to ends of the first resisting portion 230. The protrusion 234 defines a substantially arcuate end surface 2342. The end surface 2342 matches with the contour of the battery 30. The end surfaces 2342 engage with the recesses 2120 to sandwich the battery 30 between the retaining members 21 and the resisting member 23.

In assembly, first, the battery 30 is inserted in the receiving portion 29, the limiting portions 212 of the retaining members 21 limit the battery 30 from movement in the first direction, and the limiting members 25 limits the battery 30 from movement in the third direction. Second, screws extend through the through holes 1312 and screw into the first fixing posts 11, thus, the top case 11 is secured to the bottom case 13, at this time, the resisting members 23 engage with the supporting portions 211 of the retaining members 21 to cooperatively limit and sandwich the battery 30 in the second direction. Therefore, by virtue of the retaining members 21, the resisting member 23 and the limiting members 25, the battery 30 is secured to the body 10 steadily without a bracket.

It is to be understood, even though information and advantages of the present embodiments have been set forth in the foregoing description, together with details of the structures and functions of the present embodiments, the disclosure is illustrative only; and that changes may be made in detail, especially in matters of shape, size, and arrangement of parts within the principles of the present embodiments to the full extent indicated by the broad general meaning of the terms in which the appended claims are expressed.

What is claimed is:

1. A holding mechanism for holding a battery, comprising:
   a retaining member for limiting the battery from movement in a first direction;
   a resisting member corresponding to the retaining member, the resisting member engaging with the retaining member to cooperatively support and limit the battery from movement in a second direction perpendicular to the first direction; and
   at least two limiting members arranged at opposite sides of the retaining member and used for limiting the battery from movement in a third direction, wherein the third direction is perpendicular to the first direction and the second direction;
   wherein the resisting member comprises a first resisting portion and a second resisting portion, the first resisting portion extends in the third direction, the second resisting portion extends in the second direction.

2. The holding mechanism of claim 1, wherein the retaining member comprises a supporting portion and two limiting portions arranged at opposite end of the supporting portion, the limiting members limit the battery in the first direction, the supporting portion supports the battery and engages with the resisting member to sandwich and limit the battery from movement in the second direction.

3. The holding mechanism of claim 2, wherein the supporting portion defines a recess for holding the battery.

4. The holding mechanism of claim 1, wherein the first resisting portion orthogonally intersects with the second resisting portion.

5. The holding mechanism of claim 1, wherein a protrusion projects from the second direction, the protrusion defines an end surface matching with the contour of the battery, the protrusion engages with the supporting portion to sandwich and limit the battery from movement in the second direction.

6. An electronic device, comprising:
   a housing;
   a battery accommodated in the housing; and
   a holding mechanism for securing the battery to the housing, wherein the holding mechanism comprise a retaining member, a resisting member and at least two limiting members, the retaining member is configured for limiting the battery from movement in a first direction, the resisting member corresponds to the retaining member and engages with the retaining member to cooperatively support and limit the battery from movement in a second direction perpendicular to the first direction, the at least two limiting members is arranged at opposite sides of the retaining member and is configured for limiting the battery from movement in a third direction, the third direction is perpendicular to the first direction and the second direction;
   wherein the retaining member comprises a supporting portion and two limiting portions arranged at opposite end of the supporting portion, the limiting members limit the battery from movement in the first direction, the supporting portion supports the battery and engages with the resisting member to sandwich and limit the battery from movement in the second direction; the retaining member further comprises a second reinforcing member orthogonally intersecting with the supporting portion to reinforce the supporting portion.

7. The electronic device of claim 6, wherein the housing comprises a top case and a bottom case engaging with the top case.

8. The electronic device of claim 7, wherein the retaining member and the at least two limiting members are arranged on one of the top case and the bottom case, the resisting member is arranged on the other one of the top case and the bottom case.

9. The electronic device of claim 7, wherein the retaining member further comprises two first reinforcing members, the first reinforcing members are attached to the limiting portions to strengthen the corresponding limiting portions.

10. The electronic device of claim 6, wherein the supporting portion defines a recess for holding the battery.

11. The electronic device of claim 8, wherein the resisting member comprises a first resisting portion and a second resisting portion, the first resisting portion extends in the third direction, the second resisting portion extends in the second direction.

12. The electronic device of claim 11, wherein the first resisting portion orthogonally intersects with the second resisting portion.

13. The electronic device of claim 11, wherein a protrusion projects from the second direction, the protrusion defines an end surface matching with the contour of the battery, the protrusion engages with the supporting portion to sandwich and limit the battery from movement in the second direction.

* * * * *